United States Patent
Schumann

(10) Patent No.: US 7,472,151 B2
(45) Date of Patent: Dec. 30, 2008

(54) SYSTEM AND METHOD FOR ACCELERATING ARITHMETIC DECODING OF VIDEO DATA

(75) Inventor: Reinhard Schumann, Exeter, NH (US)

(73) Assignee: Broadcom Corporation, Irvine, CA (US)

(*) Notice: Subject to any disclaimer, the term of this patent is extended or adjusted under 35 U.S.C. 154(b) by 756 days.

(21) Appl. No.: 10/871,219

(22) Filed: Jun. 18, 2004

(65) Prior Publication Data

US 2004/0260739 A1 Dec. 23, 2004

Related U.S. Application Data

(60) Provisional application No. 60/480,415, filed on Jun. 20, 2003.

(51) Int. Cl.
*G06F 17/10* (2006.01)
(52) U.S. Cl. ..................................... 708/322
(58) Field of Classification Search .................. 708/322
See application file for complete search history.

(56) References Cited

U.S. PATENT DOCUMENTS

| 6,646,578 | B1 * | 11/2003 | Au ............................. 341/67 |
| 2003/0215018 | A1 | 11/2003 | MacInnis |
| 2004/0240559 | A1 * | 12/2004 | Prakasam et al. ...... 375/240.25 |
| 2005/0259747 | A1 | 11/2005 | Schumann |
| 2005/0262375 | A1 | 11/2005 | Schumann |

* cited by examiner

*Primary Examiner*—David H Malzahn
(74) *Attorney, Agent, or Firm*—McAndrews Held & Malloy Ltd.

(57) ABSTRACT

Presented herein is a system and apparatus for accelerating arithmetic decoding of encoded data. In one embodiment, there is presented a symbol interpreter for decoding CABAC coded data. The symbol interpreter comprises a first memory, a CABAC decoding loop, and a syntax assembler. The first memory receives a bitstream comprising the CABAC coded data at a channel rate. The CABAC decoding loop decodes the CABAC symbols at the channel rate, and comprises an arithmetic decoder for generating binary symbols from the CABAC coded data at the channel rate. The syntax assembler decodes the binary symbols at a consumption rate.

18 Claims, 4 Drawing Sheets

SYSTEM AND METHOD FOR ACCELERATING ARITHMETIC DECODING OF VIDEO DATA

RELATED APPLICATIONS

This application claims the benefit of "Video Data Processing", Provisional Application for U.S. Patent, Ser. No. 60/480,415, filed Jun. 20, 2003, by Schumann.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Based on established and proposed standards for encoding and decoding video data, such as H.264 (also known as MPEG-4, Part 10, and Advanced Video Coding), encoded digital video data may be broadcast at data rates exceeding 20 MBits per second for high definition television (HDTV). For compression, the H.264 standard allows individual frames to be encoded using varying amounts of data. As an example, the first frame of a sequence contains complete picture detail, and therefore requires more data, while subsequent frames are largely predicted from preceding frames, and therefore need only enough data to describe the differences.

H.264 optionally uses context adaptive binary arithmetic coding (CABAC) to further compress data that has already been compressed using spatial and temporal prediction, transforms, quantization and other techniques.

Unlike the other methods, CABAC is categorized as lossless compression because CABAC coding does not result in the loss of information. Nevertheless, CABAC can result in considerable compression gains.

In CABAC encoded data, a "syntax element", which typically represents a coefficient or other datum from prior compression, is encoded as a variable length sequence of binary bits ("Bins"), and the individual Bins (i.e. 2-valued symbols) are then encoded using arithmetic coding. Arithmetic encoding expresses a sequence of symbols as a single fractional binary number between 0 and 1 using recursive subdivision of intervals to encode successive symbols. The number has as many fractional bits of precision as are needed to express its value. The relative likelihood of occurrence of a 1 and a 0 is used to encode the Bin with statistically optimal efficiency. In the CABAC decoder, a dynamic context table is kept with likelihood entries for each of many different types of Bins within syntax elements. The context table is preloaded at the beginning of a "slice" of video data, and subsequently the appropriate context table entry is updated after each Bin of a syntax element is decoded. Because a context table entry is referenced and updated in order for each Bin, parallelization of the decoding process is computationally complex.

A typical HDTV video decoder may assemble 30 frames per second. The standard allows for encoded frame data sizes as high as 12 Mbits per frame for HDTV. Therefore, an arithmetic decoder may need to decode at speeds of 360 Mbits/sec of encoded data at a peak decoding rate, if it is to complete the decoding process for each frame within one frame time. The peak rate of Bins is even higher than 360 Mbits/sec in this case. It is difficult using conventional CMOS integrated circuits, to build an arithmetic decoder and context memory that operates at this rate.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Presented herein is a system and apparatus for accelerating arithmetic decoding of encoded data.

In one embodiment, there is presented a method for decoding context adaptive binary arithmetic coded data. The method comprises receiving a bitstream comprising the context adaptive binary arithmetic coded data at a channel rate; decoding the context adaptive binary arithmetic coded data at the channel rate, wherein decoding the context adaptive binary arithmetic coded data at the channel rate comprises generating a stream of intermediate binary symbols from the context adaptive binary arithmetic coded data at the channel rate; and decoding the stream of intermediate binary symbols at a consumption rate.

In another embodiment, there is presented a symbol interpreter for decoding context adaptive binary arithmetic coded data. The symbol interpreter comprises a first memory, a context adaptive binary arithmetic coded data decoding loop, and a syntax assembler. The first memory receives a bitstream comprising the context adaptive binary arithmetic coded data at a channel rate. The context adaptive binary arithmetic coded data decoding loop decodes the context adaptive binary arithmetic coded data at the channel rate, and comprises an arithmetic decoder for generating intermediate binary symbols from the context adaptive binary arithmetic coded data at the channel rate. The syntax assembler decodes the intermediate binary symbols to generate syntax elements at a consumption rate.

In another embodiment, there is presented a decoder for decoding context adaptive binary arithmetic coded data. The decoder comprises a first memory, a context adaptive binary arithmetic coded data decoding loop, and a syntax assembler. The first memory receives a bitstream comprising the context adaptive binary arithmetic coded data at a channel rate. The context adaptive binary arithmetic coded data decoding loop is operably coupled to the first memory to decode the context adaptive binary arithmetic coded data at the channel rate, and comprises an arithmetic decoder. The arithmetic decoder is operably coupled to the first memory to generate intermediate binary symbols from the context adaptive binary arithmetic coded data at the channel rate. The syntax assembler is operably coupled to the arithmetic decoder to decode the binary symbols to generate syntax elements at a consumption rate.

These and other advantages, aspects and novel features of the present invention, as well as details of illustrative aspects thereof, will be more fully understood from the following description and drawings.

DETAILED DESCRIPTION OF THE INVENTION

Figure 1:
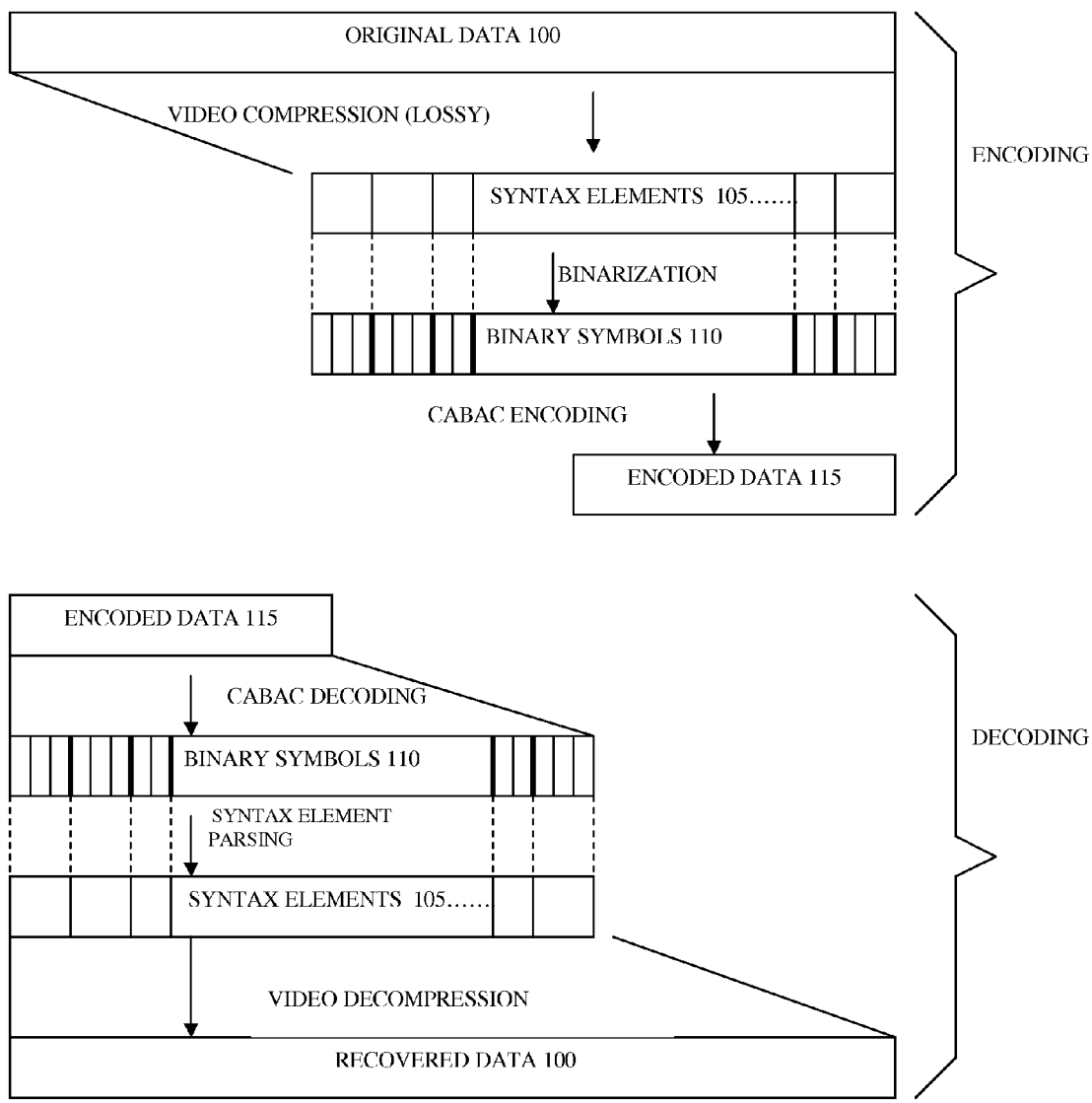
FIG. 1 is a block diagram describing exemplary encoded data.

Referring now to FIG. 1, there is illustrated a block diagram describing exemplary encoded data. A data stream, that can represent a variety of original data 100, such as digital video or audio, comprises a bit stream of data.

For example, where the original data is digital video, compression standards such as H.264 use spatial, temporal prediction, transformations, quantization, and scanning to reduce the amount of data representing the video data. Generally, the video data is represented by frequency coefficients and side information, known as syntax elements 105. An encoder converts the syntax elements 105 into what are known as binary symbols (Bins) 110. The Bins 110 are then encoded using arithmetic coding. Arithmetic encoding expresses a sequence of symbols as a single fractional binary number between 0 and 1 using recursive subdivision of intervals to encode successive symbols. The number has as many fractional bits of precision as are needed to express its value. The relative likelihood of occurrence of a 1 and a 0 is used to encode the Bin with statistically optimal efficiency. In context adaptive binary arithmetic coding (CABAC), a dynamic context table is kept with likelihood entries for each of many different types of Bins within syntax elements. The context table is preloaded at the beginning of a "slice" of video data, and subsequently the appropriate context table entry is updated after each Bin of a syntax element is decoded. The foregoing results in CABAC data 115.

A transmitter can then transmit or broadcast the CABAC data 115 to decoders. Prior to transmission, additional processing, such as packetization and transport layering may also occur. The of CABAC data 115 preferably comprises significantly fewer bits than the original data 100. As a result, less memory is used to store the CABAC data 115 and less bandwidth is used to transmit the CABAC data 115. When the CABAC data 115 arrives at the decoder, the decoder decodes the CABAC data 115 back to the syntax elements 105. The decoder then decodes the syntax elements 105 to reconstruct the original data 100. In many cases, it is desirable to reconstruct the original data 100 in real time. For example, where the original data 100 represents digital video, the reconstructed original data 100 is displayed on a display device at specific times. Digital video 100 comprises a series of frames. When displayed at specific times, the frames simulate motion picture.

To display the frames for HDTV, the decoder reconstructs frames, on average, at least 30 frames/second. However, in H.264, varying amounts of the CABAC data 115 represent each frame. These amounts may vary, for example, from between a few dozen bits to 12 Mbits or more Therefore, to provide HDTV, the CABAC data 115 is decoded and decompressed at peak rates of up to 360 Mbits/sec. While the amount of data encoding each frame is varying, the frames in aggregate are still decoded at the same average rate for real-time applications. Decoding the CABAC data 115 back to the syntax elements 105 involves converting the CABAC data 115 to binary symbols 110, and converting the binary symbols 110 to syntax elements 105. Decoding the CABAC data 115 in parallel is difficult because the decoding of each Bin 110 from CABAC data 115 depends on previously decoded Bins 110. As noted above, the CABAC data 115 assigned to code Bins 110 depends on the context table values developed from the previous Bins 110.

Figure 2:
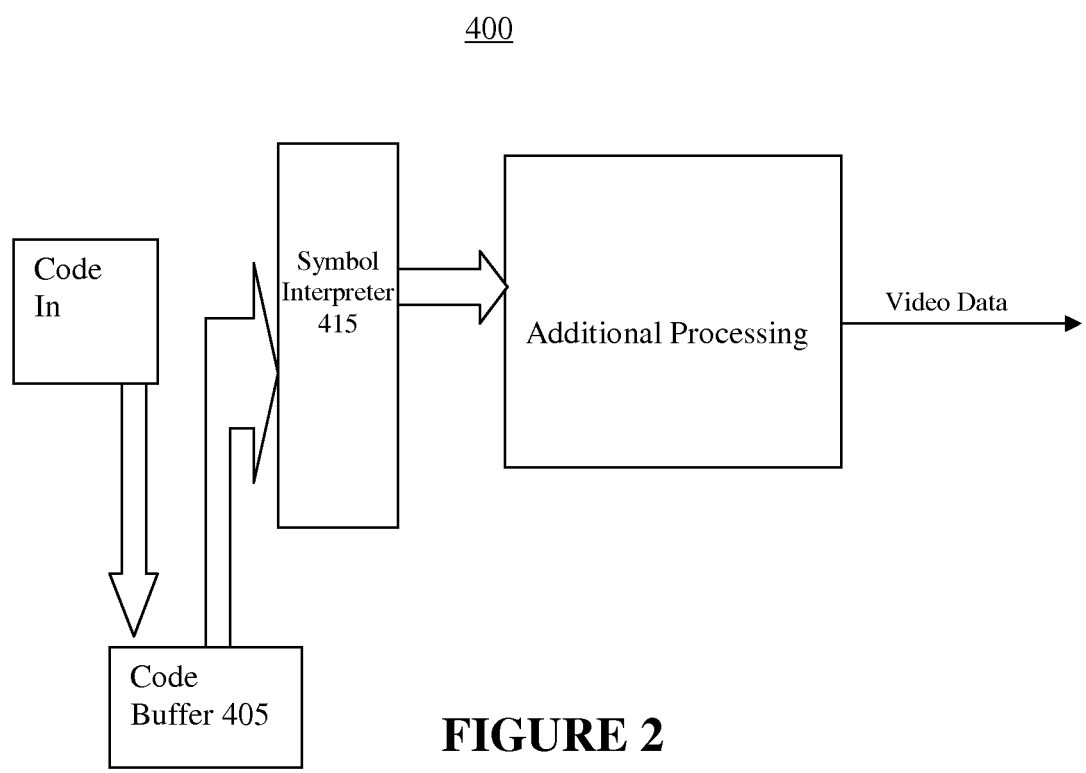
FIG. 2 is a block diagram of a video decoder in accordance with an embodiment of the present invention.

Referring now to FIG. 2, there is illustrated a block diagram describing an exemplary video decoder 400 in accordance with an embodiment of the present invention. The video decoder 400 includes a code buffer 405 for receiving a video elementary stream. The code buffer 405 can be a portion of a memory system, such as a dynamic random access memory (DRAM). A symbol interpreter 415 in conjunction with a context memory 410 decodes the CABAC Bins and syntax elements from the bitstream. The context memory 410 can be another portion of the same memory system as the code buffer 405, or a portion of another memory system.

The symbol interpreter 415 includes a VLC decoder 415V and a CABAC decoder 415B. The VLC decoder 415V decodes sequences of Bins into syntax elements. The symbol interpreter 415 provides the syntax elements 105 for additional processing to recover the original data 100, e.g, video data.

The symbol interpreter 415 receives the bit stream 115 of CABAC data 115 at a channel rate. For a video playback operation, the syntax elements 105 are processed to provide frames of digital video 100 at a consumption rate.

Figure 3:
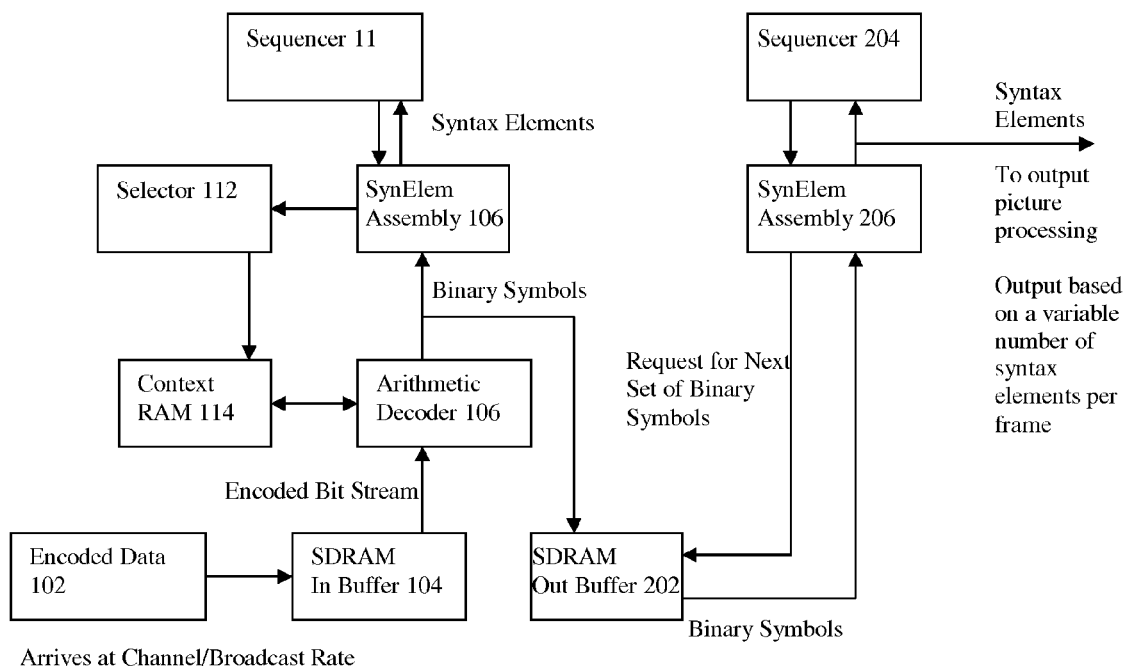
FIG. 3 is a block diagram of an exemplary context adaptive binary arithmetic code decoder in accordance with an embodiment of the present invention.
Figure 4:
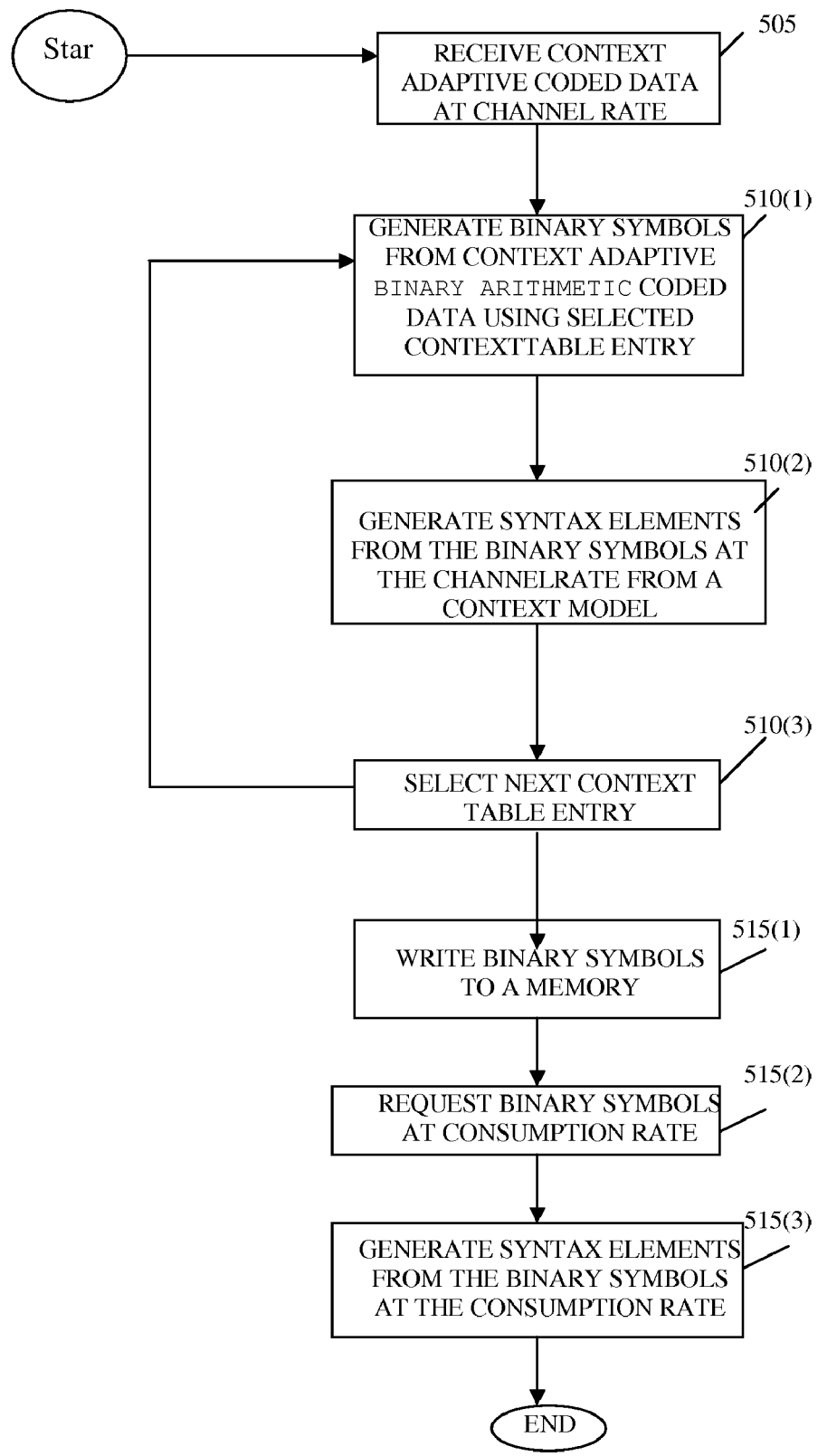
FIG. 4 is a flow diagram for decoding encoded data in accordance with an embodiment of the present invention.

Referring now to FIG. 3, there is illustrated a block diagram of the symbol interpreter 415B in accordance with an embodiment of the present invention. The symbol interpreter 415B comprises a first memory 104, such as SDRAM 104, a CABAC decoding loop, and a syntax element assembler 206. The first memory 104 receives CABAC data 115 at a channel rate.

The CABAC decoding loop decodes the CABAC data 115 at the channel rate. The CABAC decoding loop comprises an arithmetic decoder 106, and can also comprise another syntax assembler 108, and a selector 112. The arithmetic decoder 106 converts the CABAC data 115, to Bins 110 at the channel rate. The syntax assembler 108 converts the Bins 110 to syntax elements 105. The selector 112 selects the context table entry to be used for decoding the next Bin based on the preceeding sequence of syntax elements 105. The arithmetic decoder 106 converts CABAC data 115 to Bins 110 using (and updating) the selected context table entries stored in context RAM 114. Sequencer 11 controls initialization of the context RAM 114 and starting and stopping of the CABAC decoding process.

While the CABAC decoding loop decodes the CABAC data 115 at the channel rate, the syntax element assembler 206, similar to but possibly separate from syntax element assembler 108, decodes the Bins 110 at the consumption rate, thereby generating syntax elements 105. The syntax element assembler 108 can also be associated with a sequencer 204.

The symbol interpreter 415 can also include another memory 202, such as a buffer within an SDRAM, for storing Bins 110 generated by the arithmetic decoder 106. The syntax element assembler 206 can request the Bins 110 from the memory 202 at the consumption rate.

Referring now to FIG. 5, there is illustrated a flow diagram for decoding CABAC data 115 in accordance with an embodiment of the present invention. At 505, the CABAC data 115, is received at a channel rate.

At 510, the CABAC data 115 is decoded to Bins 110 at the channel rate. At 515, the Bins 110 are decoded at a consumption rate, thereby generating syntax elements 105.

Decoding the CABAC data 115 at the channel rate can also include generating 510(2) syntax elements 105 from the binary symbols, and selecting 510(3) the context table entry to be used for decoding the next bin, based on the preceeding sequence of syntax elements 105.

The Bins 110 can also be written 515(1) to a memory. The Bins 110 can subsequently be requested 515(2) at the consumption rate and syntax elements 105 can then be generated 515(3) from the Bins 110 at the consumption rate.

The embodiments described herein may be implemented as a board level product, as a single chip, application specific integrated circuit (ASIC), as part of an ASIC containing other functions, or with varying levels of the decoder system integrated with other portions of the system as separate components.

The degree of integration of the decoder system will primarily be determined by the speed and cost considerations. Because of the sophisticated nature of modern processor, it is possible to utilize a commercially available processor, which may be implemented external to an ASIC implementation. If the processor is available as an ASIC core or logic block, then the commercially available processor can be implemented as part of an ASIC device wherein certain functions can be implemented in firmware. Alternatively, the functions can be implemented as hardware accelerator units controlled by the processor.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope.

Therefore, it is intended that the present invention not be limited to the particular embodiment disclosed, but that the present invention will include all embodiments falling within the scope of the appended claims.

The invention claimed is:

1. A method for decoding context adaptive binary arithmetic coded data, said method comprising:
   receiving a bitstream comprising the context adaptive binary arithmetic coded data at a channel rate;
   decoding the context adaptive binary arithmetic coded data at the channel rate, wherein decoding the context adaptive binary arithmetic coded data at the channel rate comprises generating bins from the context adaptive binary arithmetic coded data at the channel rate; and
   decoding the bins at a consumption rate, wherein the context adaptive binary arithmetic coded data encodes video data, and wherein the consumption rate corresponds to a display rate of the encoded video data.

2. The method of claim 1, wherein decoding the context adaptive binary arithmetic coded data at the channel rate comprises:
   generating syntax elements from the bins at the consumption rate;
   selecting context table entries for decoding a portion of the bins on the basis of a portion of the syntax elements, the portion of the syntax elements corresponding to another portion of the bins, the another portion of the bins preceding the portion of the bins.

3. The method of claim 2, wherein decoding the bins at the consumption rate further comprises:
   generating syntax elements from the bins at the consumption rate.

4. The method of claim 1, further comprising:
   writing the bins to a memory.

5. The method of claim 4, further comprising:
   requesting the bins from the memory at the consumption rate.

6. A decoder for decoding context adaptive binary coded data, said decoder comprising:
   a first memory for receiving at a channel rate, a bitstream comprising the context adaptive binary coded data;
   a context adaptive binary arithmetic coded data decoding loop for decoding the context adaptive binary arithmetic coded data at the channel rate, the context adaptive binary arithmetic coded data decoding loop comprising an arithmetic decoder for generating bins from the context adaptive binary arithmetic coded data at the channel rate; and
   a syntax assembler for decoding the bins at a consumption rate, thereby generating syntax elements, wherein the context adaptive binary arithmetic coded data encodes video data, and wherein the consumption rate corresponds to a display rate of the encoded video data.

7. The decoder of claim 6, wherein the context adaptive binary arithmetic coded data decoding loop further comprises:
   another syntax assembler for generating syntax elements from the bins at the channel rate;
   a selector for selecting context table entries for decoding a portion of the bins on the basis of a portion of the syntax elements, the portion of the syntax elements corresponding to another portion of the bins, the another portion of the bins preceding the portion of the bins.

8. The decoder of claim 6, further comprising:
   another memory for storing the bins.

9. The decoder of claim 8, wherein the syntax assembler requests the bins from the memory at the consumption rate.

10. The decoder of claim 9, wherein the syntax assembler pulls the bins from the memory at the consumption rate.

11. The decoder of claim 6, wherein the context adaptive binary arithmetic coded data decoding loop accesses a context table RAM.

12. A decoder for decoding context adaptive binary arithmetic coded data, said decoder comprising:
   a first memory for receiving at a channel rate, a bitstream comprising the context adaptive binary arithmetic coded data;
   a context adaptive binary arithmetic coded data decoding loop operably coupled to the first memory to decode the context adaptive binary arithmetic coded data at the channel rate, the context adaptive binary arithmetic coded data decoding loop further comprising an arithmetic decoder operably coupled to the first memory to generate bins from the context adaptive binary arithmetic coded data at the channel rate; and
   a syntax assembler operably coupled to the arithmetic decoder to decode the bins at a consumption rate, thereby generating syntax elements; and
   wherein the context adaptive binary arithmetic coded data encodes video data, and wherein the consumption rate corresponds to a display rate of the encoded video data.

13. The decoder of claim 12, wherein the context adaptive coded decoding loop further comprises:
   another syntax assembler operably coupled to the arithmetic decoder to generate syntax elements from the bins at the channel rate; and
   a selector operably coupled to the other syntax assembler, said selector for selecting context table entries for decoding a portion of the bins on the basis of a portion of the syntax elements, the portion of the syntax elements corresponding to another portion of the bins, the another portion of the bins preceding the portion of the bins.

14. The decoder of claim 12, further comprising:

another memory operably coupled to the arithmetic decoder, said another memory operable to store the bins generated by the arithmetic decoder.

15. The decoder of claim 14, wherein the syntax assembler is operable to request the bins from the memory at the consumption rate.

16. The decoder of claim 14, wherein the another memory operable to store the bins generated by the arithmetic decoder further comprises RAM.

17. The decoder of claim 14, wherein the another memory operable to store the bins generated by the arithmetic decoder further comprises SDRAM.

18. The decoder of claim 12, wherein the context adaptive binary arithmetic coded data decoding loop accesses a context table RAM.

* * * * *